(12) United States Patent
Harley et al.

(10) Patent No.: US 7,889,176 B2
(45) Date of Patent: *Feb. 15, 2011

(54) CAPACITIVE SENSING IN DISPLACEMENT TYPE POINTING DEVICES

(75) Inventors: Jonah Harley, Mountain View, CA (US); Robert E. Wilson, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1215 days.

This patent is subject to a terminal disclaimer.

(21) Appl. No.: 11/488,559

(22) Filed: Jul. 18, 2006

(65) Prior Publication Data

US 2008/0018596 A1 Jan. 24, 2008

(51) Int. Cl.
*G06F 3/33* (2006.01)
(52) U.S. Cl. .................. 345/157; 345/179; 345/160
(58) Field of Classification Search .................. 345/156, 345/157, 159, 173, 76, 102, 160, 174, 177, 345/179; 324/686, 688; 382/124; 178/18.01, 178/18.03–18.06, 19.02
See application file for complete search history.

(56) References Cited

U.S. PATENT DOCUMENTS

| | | | |
|---|---|---|---|
| 3,700,905 A * | 10/1972 | Parkin et al. .............. 250/203.1 |
| 3,973,270 A * | 8/1976 | Schroder et al. ............. 257/461 |
| 3,987,685 A | 10/1976 | Opocensky |
| 4,670,743 A | 6/1987 | Zemke |
| 4,719,455 A | 1/1988 | Louis |
| 5,006,952 A * | 4/1991 | Thomas .................... 361/283.2 |
| 5,056,146 A | 10/1991 | Nishide |
| 5,086,296 A | 2/1992 | Clark |
| 5,134,887 A * | 8/1992 | Bell ............................ 73/718 |
| 5,191,971 A | 3/1993 | Hakkarainen et al. |
| 5,252,952 A | 10/1993 | Frank et al. |
| 5,263,134 A | 11/1993 | Paal |
| 5,305,017 A * | 4/1994 | Gerpheide ................... 345/174 |
| 5,343,765 A | 9/1994 | Okada |
| 5,421,694 A * | 6/1995 | Baker et al. ................. 414/694 |
| 5,504,502 A | 4/1996 | Arita et al. |
| 5,515,044 A | 5/1996 | Glatt |
| 5,615,083 A | 3/1997 | Burnett |
| 5,659,334 A | 8/1997 | Yaniger |
| 5,703,356 A | 12/1997 | Bidiville et al. |

(Continued)

FOREIGN PATENT DOCUMENTS

DE 4033465 5/1991

(Continued)

OTHER PUBLICATIONS

U.S. Appl. No. 11/606,556, filed Nov. 30, 2007, Harley et al.

(Continued)

*Primary Examiner*—Prabodh M Dharia

(57) ABSTRACT

A pointing device includes a sense electrode structure and a displaceable member. The sense electrode structure includes an arrangement of peripheral sense electrodes in a peripheral region surrounding a central sense electrode. The displaceable member is movable in an operational zone over the sense electrode structure. The displaceable member includes a target electrode facing the sense electrodes and overlapping at least a respective portion of the central sense electrode in each position of the displaceable member in the operational zone.

21 Claims, 12 Drawing Sheets

U.S. PATENT DOCUMENTS

| | | | |
|---|---|---|---|
| 5,704,037 A | 12/1997 | Chen | |
| 5,739,821 A | 4/1998 | Ho et al. | |
| 5,808,603 A | 9/1998 | Chen | |
| 5,815,139 A | 9/1998 | Yoshikawa et al. | |
| 5,874,956 A | 2/1999 | LaHood | |
| 5,883,690 A | 3/1999 | Meyers et al. | |
| 5,889,507 A | 3/1999 | Engle et al. | |
| 5,914,465 A | 6/1999 | Allen | |
| 5,949,354 A * | 9/1999 | Chang | 341/33 |
| 5,956,016 A | 9/1999 | Kuenzner et al. | |
| 6,115,030 A | 9/2000 | Berstin et al. | |
| 6,198,473 B1 | 3/2001 | Armstrong | |
| 6,215,478 B1 | 4/2001 | Yeh et al. | |
| 6,256,012 B1 | 7/2001 | Devolpi | |
| 6,288,707 B1 | 9/2001 | Philipp | |
| 6,292,174 B1 | 9/2001 | Mallett et al. | |
| 6,326,948 B1 | 12/2001 | Kobachi et al. | |
| 6,489,950 B1 | 12/2002 | Griffin et al. | |
| 6,492,911 B1 | 12/2002 | Netzer | |
| 6,525,713 B1 | 2/2003 | Soeta et al. | |
| 6,530,283 B2 * | 3/2003 | Okada et al. | 73/780 |
| 6,646,631 B2 | 11/2003 | Suzuki et al. | |
| 6,657,559 B1 | 12/2003 | Li | |
| 6,667,733 B2 | 12/2003 | Miyoshi | |
| 6,730,863 B1 | 5/2004 | Gerpheide et al. | |
| 6,753,848 B2 | 6/2004 | Toshiharu | |
| 6,762,748 B2 | 7/2004 | Maatta et al. | |
| 6,765,557 B1 | 7/2004 | Segal et al. | |
| 6,816,148 B2 | 11/2004 | Mallett et al. | |
| 6,816,154 B2 | 11/2004 | Wong et al. | |
| 6,961,052 B1 | 11/2005 | Vaziri | |
| 7,019,765 B2 | 3/2006 | Fujiwara et al. | |
| 7,042,441 B2 | 5/2006 | Adams et al. | |
| 7,046,230 B2 | 5/2006 | Zadesky et al. | |
| 7,061,468 B2 | 6/2006 | Tiphane et al. | |
| 7,123,028 B2 | 10/2006 | Okada et al. | |
| 7,158,115 B2 | 1/2007 | Harley et al. | |
| 7,253,643 B1 | 8/2007 | Seguine | |
| 7,344,273 B2 | 3/2008 | Lewis et al. | |
| 7,639,234 B2 * | 12/2009 | Orsley | 345/156 |
| 7,733,333 B2 * | 6/2010 | Kaliher | 345/173 |
| 2002/0093328 A1 | 7/2002 | Maatta et al. | |
| 2002/0149509 A1 | 10/2002 | Kim et al. | |
| 2002/0163547 A1 | 11/2002 | Abramson et al. | |
| 2003/0048250 A1 | 3/2003 | Boon et al. | |
| 2003/0048262 A1 | 3/2003 | Wu et al. | |
| 2003/0076301 A1 | 4/2003 | Tsuk et al. | |
| 2003/0095096 A1 | 5/2003 | Robbin et al. | |
| 2004/0032392 A1 | 2/2004 | Chi et al. | |
| 2004/0108993 A1 | 6/2004 | Suzuki et al. | |
| 2004/0130531 A1 | 7/2004 | Cheng | |
| 2005/0052406 A1 | 3/2005 | Stephanick et al. | |
| 2005/0052425 A1 | 3/2005 | Zadesky et al. | |
| 2005/0052426 A1 | 3/2005 | Hagermoser et al. | |
| 2005/0052429 A1 | 3/2005 | Philipp | |
| 2005/0062732 A1 | 3/2005 | Sinclair et al. | |
| 2005/0110755 A1 | 5/2005 | Harley et al. | |
| 2005/0190150 A1 | 9/2005 | Drake | |
| 2006/0001657 A1 | 1/2006 | Monney et al. | |
| 2006/0016800 A1 | 1/2006 | Paradiso et al. | |
| 2006/0026536 A1 | 2/2006 | Hotelling et al. | |
| 2006/0033721 A1 | 2/2006 | Woolley et al. | |
| 2006/0038783 A1 | 2/2006 | Shaw et al. | |
| 2006/0152491 A1 | 7/2006 | Lian | |
| 2006/0176270 A1 | 8/2006 | Sachs | |
| 2006/0192754 A1 | 8/2006 | Sachs et al. | |
| 2006/0202971 A1 * | 9/2006 | Kaliher | 345/173 |
| 2007/0052691 A1 | 3/2007 | Zadesky et al. | |
| 2007/0279395 A1 | 12/2007 | Philipp et al. | |
| 2007/0291016 A1 | 12/2007 | Philipp | |
| 2008/0012837 A1 | 1/2008 | Marriott et al. | |
| 2008/0024455 A1 | 1/2008 | Lee et al. | |
| 2008/0041642 A1 | 2/2008 | Trent et al. | |
| 2008/0088595 A1 | 4/2008 | Liu et al. | |
| 2008/0150905 A1 | 6/2008 | Grivna et al. | |
| 2008/0164076 A1 * | 7/2008 | Orsley | 178/18.01 |
| 2008/0237766 A1 * | 10/2008 | Kim | 257/432 |
| 2009/0135157 A1 | 5/2009 | Harley | |

FOREIGN PATENT DOCUMENTS

| | | |
|---|---|---|
| DE | 10309011 | 9/2004 |
| EP | 1136939 | 9/2001 |
| GB | 2247938 | 3/1992 |
| JP | 2222019 | 9/1990 |
| JP | 7-49325 | 2/1995 |
| JP | 2000/357049 | 12/2000 |
| JP | 2001-255996 | 9/2001 |
| JP | 2001/312363 | 11/2001 |
| JP | 2003/84916 | 3/2003 |
| WO | WO-00/51358 | 8/2000 |
| WO | WO-02/03317 | 1/2002 |
| WO | WO-2006/031332 | 3/2006 |

OTHER PUBLICATIONS

U.S. Appl. No. 60/794,723, filed Apr. 25, 2006, Harley.
U.S. Appl. No. 10/723,957, filed Nov. 24, 2003, Harley.
U.S. Appl. No. 11/407,274, filed Apr. 19, 2006, Orsley.
U.S. Appl. No. 11/923,653, filed Oct. 25, 2007, Orsley.
"Motorola SLVR", www.motorola.com/motoinfo/product/details.jsp,(unknown), 2007.
Panasonic, "Panasonic Tactile Sheet Type ESP", Dec. 2005.
Avago Technologies, "AMRI- 2000 Data Sheet", 2005.
Avago Technologies, "AMRI-2000-P000 Data Sheet", Sep. 2007.
"3M Double Coated tapes", 9731 931RW Technical Data, Feb. 2005.
"ARS Technica, iPod nano", http://arstechnica.com/reviews/ardware/nano.ars/4,, (1998), Sep. 2005.

* cited by examiner

CAPACITIVE SENSING IN DISPLACEMENT TYPE POINTING DEVICES

CROSS-REFERENCE TO RELATED APPLICATIONS

This application relates to copending U.S. patent application Ser. No. 10/723,957, filed Nov. 24, 2004, by Jonah Harley et al. and entitled "Compact Pointing Device," which is incorporated herein by reference.

BACKGROUND

Many different types of pointing devices have been developed for inputting commands into a machine. For example, hand-manipulated pointing devices, such as computer mice, joysticks, trackballs, touchpads, and keyboards, commonly are used to input instructions into a computer by manipulating the pointing device. Such pointing devices allow a user to control movement of a cursor (i.e., a virtual pointer) across a computer screen, select or move an icon or other virtual object displayed on the computer screen, and open and close menu items corresponding to different input commands.

Pointing devices have been developed for large electronic devices, such as desktop computers, which are intended to remain stationary, and for small portable electronic devices, such as cellular telephones and mobile computer systems. Pointing devices for large electronic devices typically have fewer and more flexible design constraints than pointing devices for portable electronic devices because of the greater space and power resources that are available. In general, a pointing device for use in portable electronic devices should allow a user to move a cursor quickly and accurately, operate in an intuitive fashion, and operate within limited workspace and power constraints.

Displacement type pointing devices have been developed to meet the constraints inherent in portable electronic devices. These types of pointing devices include a displaceable member (e.g., a puck, button, or other movable body) that moves in a defined field of motion upon application of force by, for example, a user's finger. When the user releases the displaceable member, a restoring mechanism (e.g., a set of springs) typically returns the displaceable member to a central location within the field of motion. A position sensor determines the displacement of the displaceable member within the field of motion and typically maps the displacement of the displaceable member to the velocity of the cursor. The position mapping system typically fixes the position of the cursor on the display after the restoring mechanism has returned the displaceable member to the central location of the field of motion.

In a typical displacement-type pointing device, the displaceable member moves in two dimensions in response to lateral forces that are directed in an x-y plane. The two-dimensional movements of the displaceable member are mapped to two-dimensional motion of a cursor on a display. In addition to being responsive to lateral forces, it oftentimes is desirable for the displacement-type pointing device to include functionality for detecting vertical or z-axis forces that are applied to the displaceable member along a z-axis that is normal to the x-y plane. The detection of such z-axis forces could be used, for example, to produce signals for controlling the selection of objects that are presented on the display or controlling the width of a virtual line being drawn on the display.

What are needed are displacement type pointing devices and methods that that can detect with high accuracy user inputs that are applied to the displaceable member in vertical as well as lateral directions.

SUMMARY

In one aspect, the invention features a pointing device that includes a sense electrode structure and a displaceable member. The sense electrode structure includes an arrangement of peripheral sense electrodes in a peripheral region surrounding a central sense electrode. The displaceable member is movable in an operational zone over the sense electrode structure. The displaceable member includes a target electrode facing the sense electrodes and overlapping at least a respective portion of the central sense electrode in each position of the displaceable member in the operational zone.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below provide displacement type pointing devices and methods that include capacitive sensing of the position of the displaceable member in ways that compensate for unintended tilt forces and other unintended gap variations across the capacitive sensing structure. Some of these embodiments also are capable of detecting with high accuracy user inputs that are applied to the displaceable member in vertical as well as lateral directions. In particular, some of these embodiments are capable of measuring force-induced displacements of the displaceable member in three dimensions without substantial crosstalk between the lateral measurements and the vertical measurements. These measurements may be made without any wired electrical connections to the displaceable member. In addition, these measurements may be made over the full range of lateral travel of the displaceable member in the operational zone.

II. Overview

Figure 1:
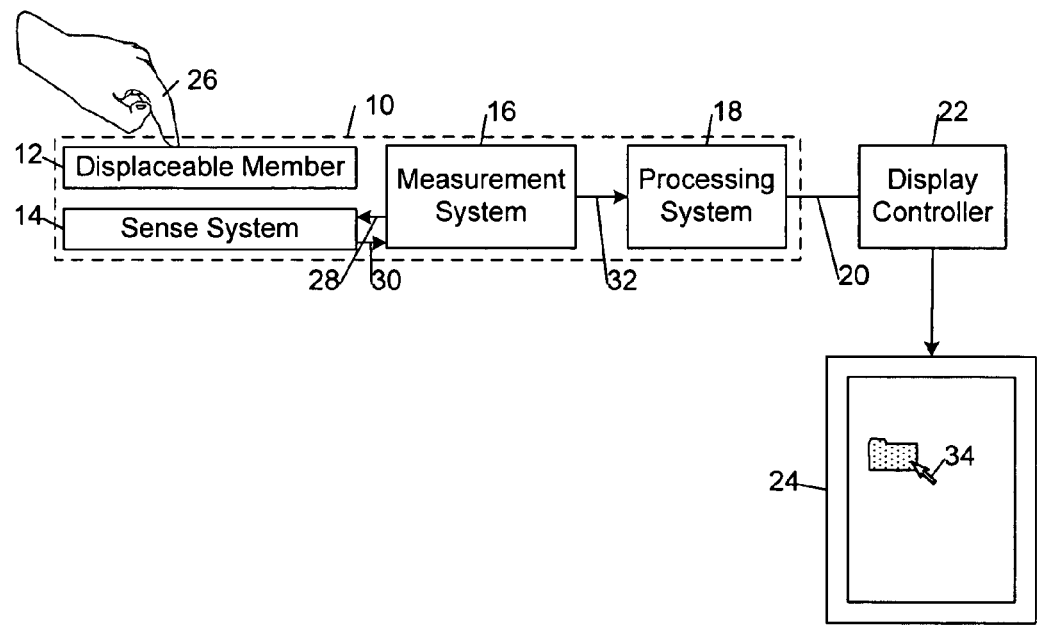
FIG. 1 is a diagrammatic view of an embodiment of a pointing device that includes a displaceable member, a sense system, a measurement system, and a processing system in an exemplary operational environment.

FIG. 1 shows an embodiment of a displacement type pointing device 10 that includes a displaceable member 12, a sense system 14, a measurement system 16, and a processing system 18. The pointing device 10 outputs display control signals 20 to a display controller 22 that drives a display 24.

The displaceable member 12 may be implemented by a puck, button, or other movable body. The displaceable member 12 is movable within a confined field of motion, which is referred to herein as the "operational zone." In one exemplary mode of operation, a user's finger 26 manipulates the displaceable member 12 within the operational zone. The displaceable member 12 typically is re-centered in the operational zone by a restoring mechanism when there is no external force applied to the displaceable member 12. The restoring mechanism may be implemented by one or more resilient structures (e.g., springs or elastomeric elements) that urge the displaceable member to a central region of the operational zone.

As explained in detail below, the displaceable member 12 includes a target electrode and the sense system 14 includes a sense electrode structure that has multiple sense electrodes. In some embodiments, in each position of the displaceable member 12 in the operational zone, the target electrode overlaps at least a respective portion of the central sense electrode and the sense electrodes extend across a sense region that completely overlaps the target electrode. The target electrode capacitively couples input signals 28 that are applied by the measurement system 16 across respective pairs of the electrodes of the sense electrode structure. In response to the applied input signals 28, the sense electrode structure produces sense signals 30 that are responsive to a touching of the displaceable member 12 by the user's finger 26 and to the different positions of the displaceable member 12 in the operational zone.

The measurement system 16 applies the input signals 28 to the sense system 14 and generates measurement values 32 from the resulting sense signals 30. The measurement values 32 are indicative of the different lateral positions of the displaceable member 12 in the operational zone and the vertical forces that are applied to the displaceable member 12. In this way, the measurement system 16 can detect when the displaceable member 12 is being touched or depressed to make a display-based selection. In addition, the measurement system 16 can detect the current positions of the displaceable member 12 within the operational zone. The measurement signals 32 that are generated by the sense system 16 either directly convey the current positions of the displaceable member 12 within the operational zone or convey information from which the current positions of the displaceable member 12 within the operational zone can be derived.

The processing system 18 translates the measurement signals 32 into the display control signals 20. In this process, the processing system 18 determines from the measurement signals 32 the current positions of the displaceable member 12 in the operational zone. The processing system 18 also determines in-contact periods during which the displaceable member 12 is in contact with the user's finger 26. Examples of the types of display control signals 20 that may be produced by the processing system 18 include: position data (e.g., distance and direction in a coordinate system centered at the origin of the operational zone) that describe the position of the displaceable member 12 within the operational zone; cursor position and velocity data; and scrolling position and distance data. In general, the processing system 18 may be implemented by one or more discrete modules that are not limited to any particular hardware, firmware, or software configuration. The one or more modules may be implemented in any computing or data processing environment, including in digital electronic circuitry (e.g., an application-specific integrated circuit, such as a digital signal processor (DSP)) or in computer hardware, firmware, device driver, or software.

The display controller 22 processes the display control signals 20 to control the movement of a pointer 34 on the display 24. The display controller 22 typically executes a driver to process the display control signals 20. In general, the driver may be in any computing or processing environment, including in digital electronic circuitry or in computer hardware, firmware, or software. In some embodiments, the driver is a component of an operating system or an application program.

The display 24 may be, for example, a flat panel display, such as a LCD (liquid crystal display), a plasma display, an EL display (electro-luminescent display) and a FED (field emission display).

In some embodiments, the pointing device 10 and the display 24 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console. In other embodiments, the pointing device 10 and the display 24 are implemented as separate discrete devices, such as a separate pointing device and a remote display-based system. In general, the remote system may be any type of display-based appliance that receives user input, including a general-purpose computer system, a special-purpose computer system, and a video game system. The display control signals 20 may be transmitted to remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link).

III. Exemplary Sense System Embodiments

Figure 2A:
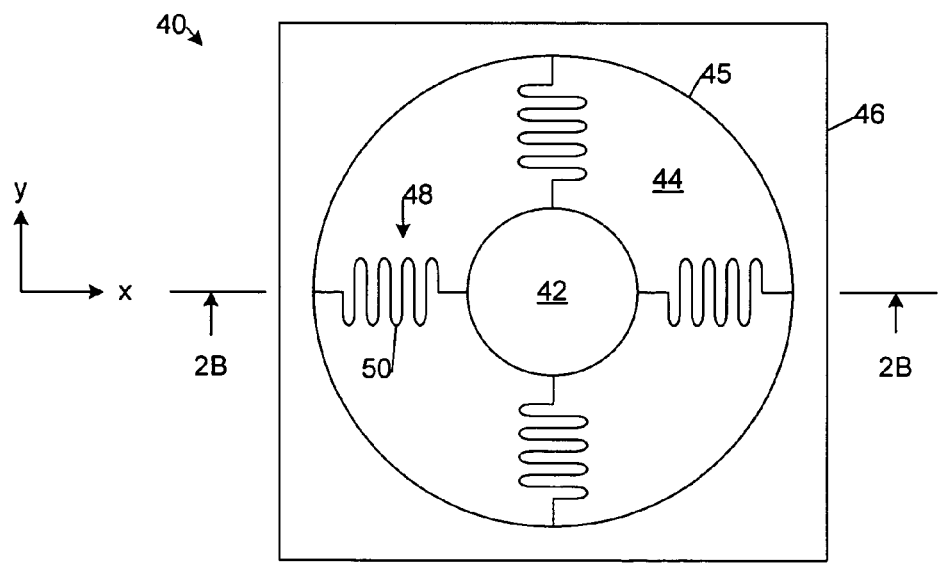
FIG. 2A is a diagrammatic top view of an embodiment of the pointing device shown in FIG. 1.
Figure 2B:
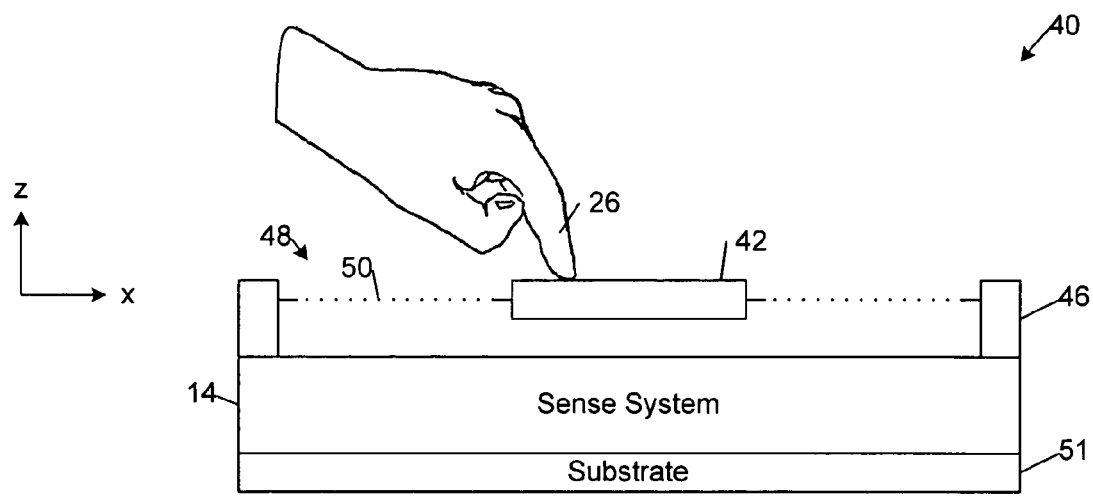
FIG. 2B is a cross-sectional view of the pointing device shown in FIG. 2A taken along the line 2B-2B.

FIG. 2A shows a top view of an exemplary embodiment 40 of the pointing device 10. FIG. 2B shows a cross-sectional view of the pointing device 40 taken along the line 2B-2B. In the pointing device 40, the displaceable member 12 is implemented by a puck 42. The puck 42 is movable within an operational zone 44 that is defined by walls 45 of a support frame 46. In general, the operational zone may have any shape, including a circular shape (as shown) and a polygonal (e.g., rectangular) shape. The support frame 46 mechanically supports a restoring mechanism 48, which is implemented for illustrative purposes by a set of four springs 50. The support frame 46 is mounted on a substrate 51 (e.g., a printed circuit board). The sense system 14 is supported underneath the puck 42 on the substrate 42.

In operation, the puck 42 moves within the operational zone 44 in response to the application of a lateral force (i.e., a force with a component in the x-y plane) by the user's finger 26. When the user releases puck 42 by removing his or her finger 26, the puck 42 is returned to its centered position by the restoring mechanism 48.

In some embodiments, the processing system 18 determines from the measurement signals 32 when the user has applied to the puck 42 a vertical force (i.e., a force with a component directed along the z-axis) that exceeds a selected threshold. Based on this information, the processing system 18 determines whether the puck 42 is in an in-contact state (i.e., when the user is manipulating the puck 42) or in an out-of-contact state (i.e., when the user is not manipulating the puck 42). The processing system 18 sets the velocity of the cursor 34 to zero during the out-of-contact state to allow the restoring mechanism 48 to re-center the puck 42 without affecting the position of the cursor 44 on the display 24. This feature is particularly desirable in laptop computers, handheld devices and other mobile electronic devices in which the field of motion of the puck 42 is significantly constrained.

In some embodiments, the processing system 18 additionally is able to detect from the measurement signals 32 when the user has applied to the puck 42 a vertical force that exceeds a second "click" threshold. Based on this information, the processing system 18 determines whether or not the puck 42 is in a selection state (or "click" state), which may correspond to a display control function that corresponds to the functions that typically are associated with the right or left buttons of a computer mouse. In this way, the user can click at the current position of the cursor 34 on the display 24 by increasing the pressure that is applied to the puck 42 beyond a precalibrated click threshold. Some embodiments of the pointing device 10 include a mechanical clicking mechanism (e.g., a resilient dome switch) that provides tactile feedback for the click threshold.

Figure 3A:
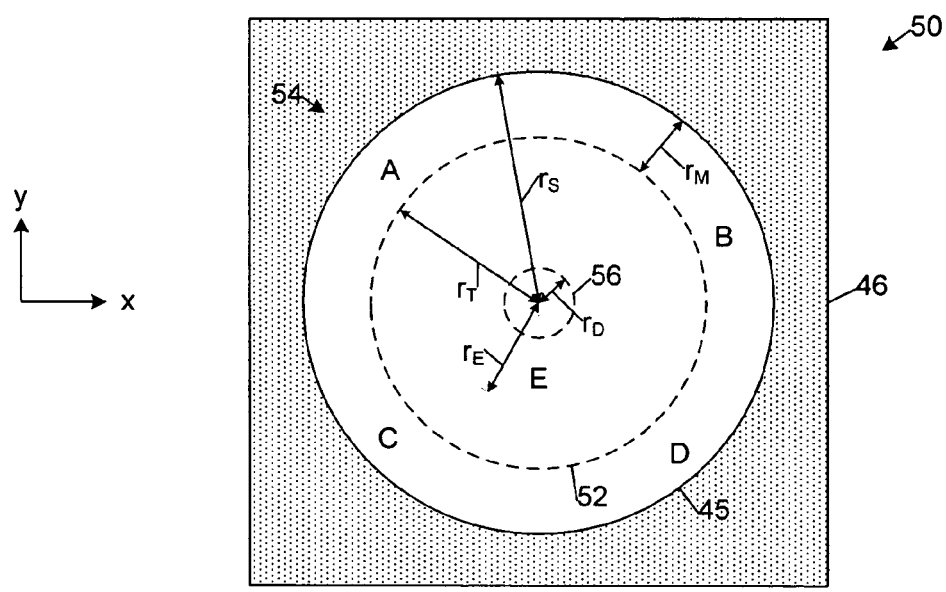
FIGS. 3A and 3B are top views of an embodiment of a target electrode shown in phantom at different respective positions over an embodiment of a sense electrode structure of the sense system shown in FIG. 1.
Figure 3B:
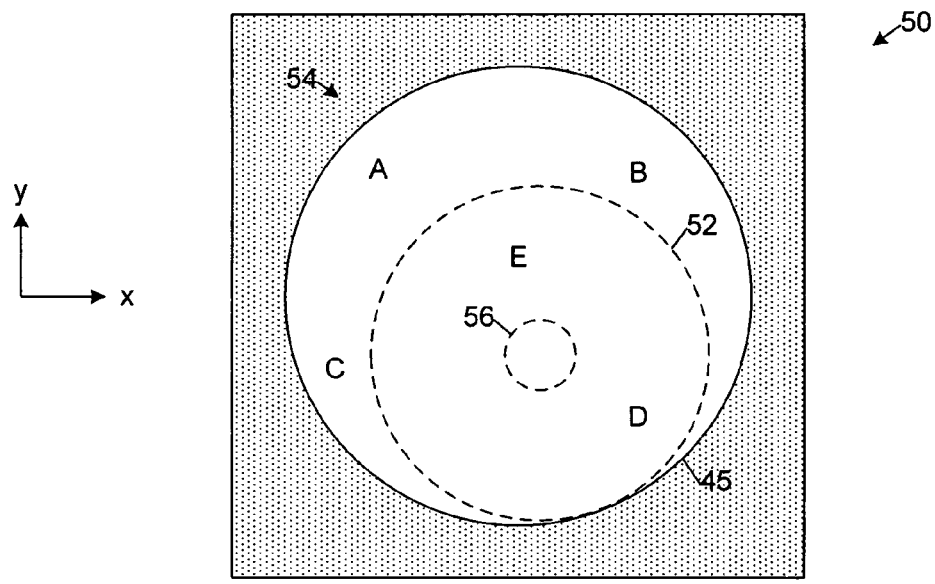

FIGS. 3A and 3B show top views of an exemplary embodiment 50 of the pointing device 10 in which the displaceable member 12 includes a target electrode 52 (shown in phantom by the dashed circle) and the sense system 14 includes a sense electrode structure 54. The sense electrode structure 54 includes four peripheral sense electrodes A, B, C, D in a peripheral region surrounding a is central sense electrode E. In the illustrated embodiment, the sense electrode structure 54 is arranged on a planar surface of the substrate 51. In other embodiments, the sense electrode structure 54 may be arranged on one or more curved (e.g., convex or concave) surfaces of the substrate 51. The sense electrodes A-E are electrically isolated from one another. Electrical connections (not shown) electrically connect the sense electrodes A-E to the measurement system 16. In some embodiments, a low-friction dielectric spacer, which is located between the target electrode 52 and the sense electrodes A-E, electrically insulates the target electrode 52 from the sense electrodes A-E while allowing the target electrode 52 to slide over the sense electrodes A-E. The amount of overlap between the target electrode 52 and each of sense electrodes A-E depends on the position of the puck 42 in relation to the sense electrodes A-E.

FIG. 3A shows the target electrode 52 centered over the central sense electrode E. FIG. 3B shows the target electrode 52 positioned against the outer wall 45 of the operational zone 44. In this embodiment, the target electrode 52 completely overlaps the central sense electrode E in each position of the displaceable member in the operational zone. That is, the radius $r_T$ of the target electrode 52 is at least the radius $r_E$ of the central sense electrode plus the radial range of motion $r_M$ of the target electrode within the operational zone (i.e., $r_T \geq r_E + r_M$). In addition, the sense electrodes A-E extend across a sense region that completely overlaps the target electrode 52 in each position of the puck 42 in the operational zone. That is, the radius $r_S$ of the sense region is at least the radius $r_T$ of the target electrode plus the radial range of motion $r_M$ of the target electrode within the operational zone (i.e., $r_S \geq r_T + r_M$). In the illustrated embodiment, the sense region coincides with the operational zone. In other embodiments, the sense region may extend over area larger than the operational zone.

The target electrode 52 includes a peripheral target electrode structure surrounding and electrically connected to a central target electrode structure that includes a displaceable electrode 56 (shown in phantom by the dashed circle) that is movable towards and away from the sense electrode structure 54 substantially independently of the surrounding peripheral target electrode structure. As shown in FIGS. 3A and 3B, the central sense electrode E completely overlaps the displaceable electrode 56 in each position of the puck 42 in the operational zone. That is, the radius $r_E$ of the central sense electrode is at least the radius $r_D$ of the displaceable electrode 56 plus the radial range of motion $r_M$ of the target electrode within the operational zone (i.e., $r_E \geq r_D + r_M$).

Figure 4A:
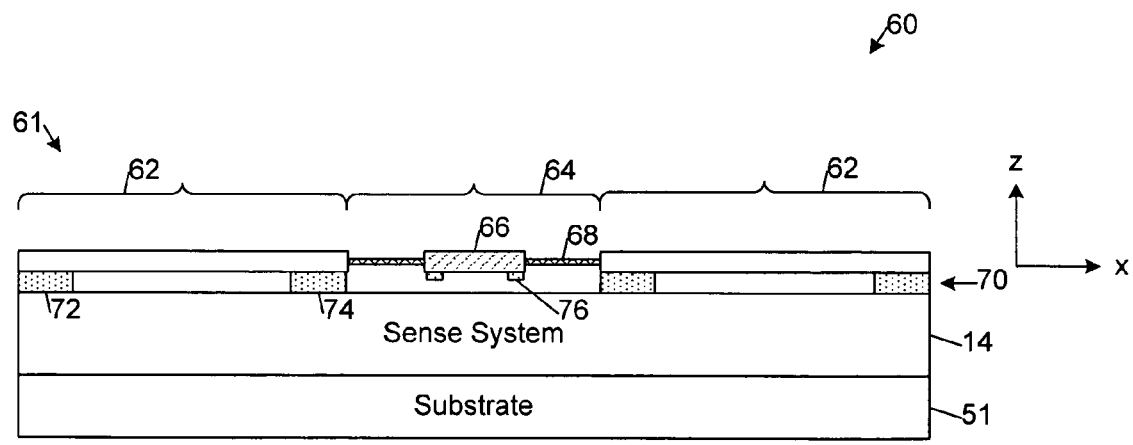
FIG. 4A is a diagrammatic cross-sectional view of an embodiment of the pointing device of FIG. 1 that includes an embodiment of a target electrode that has a displaceable electrode.
Figure 4B:
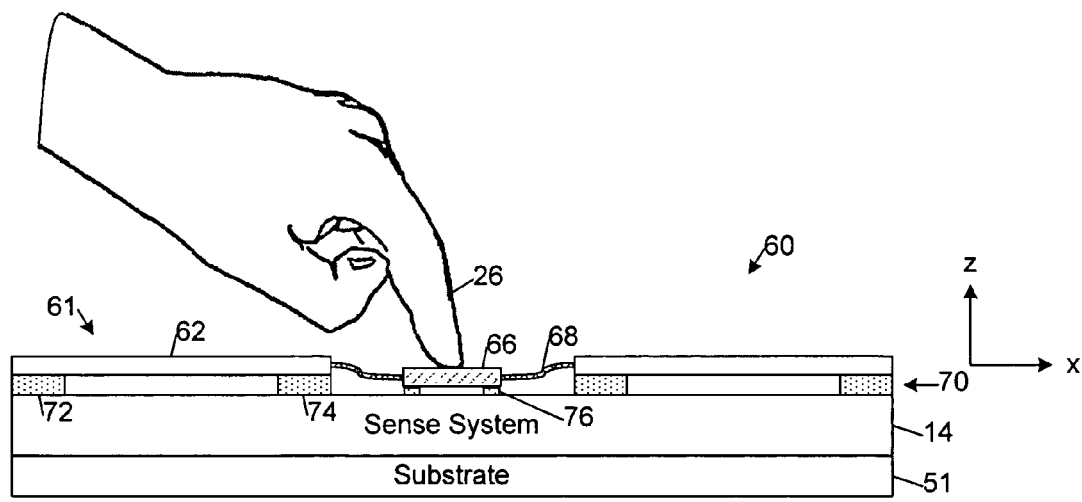
FIG. 4B is a diagrammatic cross-sectional view of the pointing device shown in FIG. 4A in which the displaceable electrode has been moved against the sense system in response to a force applied by a user's finger.

FIG. 4A shows an embodiment 60 of the pointing device 10 that includes an embodiment 61 of the target electrode 52 (shown in FIGS. 3A and 3B) that includes a planar arrangement of a peripheral target electrode structure 62 surrounding a central target electrode structure 64. The central target electrode structure 64 includes a displaceable electrode 66 that is connected to the peripheral target electrode structure 62 by a resilient restoring mechanism 68. The restoring mechanism 68 urges the displaceable electrode 66 towards an equilibrium position in response to application of an external force to the displaceable electrode. For example, in one exemplary illustration, FIG. 4B shows the displaceable electrode 66 moved from the equilibrium position shown in FIG. 4A and against the sense system 14 in response to a force applied by the user's finger 26. FIG. 4B shows the user's finger 26 in contact with the displaceable electrode 66 for illustrative purposes only. In actual embodiments, the user's finger 26 is electrically insulated from the displaceable electrode 66 by other components of the pointing device 10. The force that is applied by the user's finger 26 deforms the restoring mechanism 68 and, in response, the restoring mechanism 68 applies a restoring force that opposes the applied force and urges the displaceable electrode 66 towards the equilibrium position. Upon the removal of the force applied by the user's finger 26, the unopposed restoring force exerted by the restoring mechanism 68 returns the displaceable electrode 66 to the equilibrium position.

As shown in FIGS. 4A and 4B, a dielectric spacer 70 is between the target electrode 52 and the sense system 14. In this embodiment, the dielectric spacer 70 includes discrete dielectric films 72, 74, 76 that are attached to respective spaced apart surface areas of the target electrode 52 facing the sense system 14. Respective ones of the discrete dielectric films 72-76 are attached to peripheral surface areas of the target electrode and at least one central surface area of the target electrode 52. The dielectric films 72-76 are free to slide over surfaces of the sense electrode structure of the sense system 14. In some embodiments, the dielectric strips 72-76 are formed of a low-friction dielectric material (e.g., a plastic material, such as nylon and TEFLON®), which is bonded to the respective surface areas of the target electrode 52.

The use of multiple discrete dielectric films as opposed to a single uniform dielectric film allows the target electrode to better conform to any surface irregularities on the sense electrode structure. In addition, the dielectric spacer 70 reduces the sensitivity of the sense system to variations in the gap separating the target electrode and the sense electrode structure by increasing the permittivity between the target electrode and the sense electrode structure in relation to the permittivity of air.

In the illustrated embodiment, the dielectric films 72-76 are ring-shaped. In other embodiments, the dielectric spacer 70 may include dielectric films with shapes and sizes that are different from the dielectric films 72-76. For example, in some embodiments, the dielectric spacer 70 includes a thin film of a dielectric material (e.g., TEFLON®) that coats the entire bottom-facing surface of the target electrode 52 and prevents the displaceable electrode 66 from electrically shorting the central sense electrode. The dielectric spacer 70 additionally includes the two ring-shaped dielectric films 72, 74 adhered to the exposed surface areas of the thin film dielectric coating. The thin film dielectric coating typically has a uniform thickness in the range of 25-100 micrometers (μm) and the two ring-shaped dielectric films 72, 74 typically have thicknesses in the range of 100-300 μm.

In some embodiments, the risk of electrical shorting between the target electrode 52 and the sense electrode structure 54 additionally is reduced by adhering a thin (e.g., on the order of 100 μm) dielectric coating to the exposed top surfaces of the sense electrode structure 54.

Figure 5A:
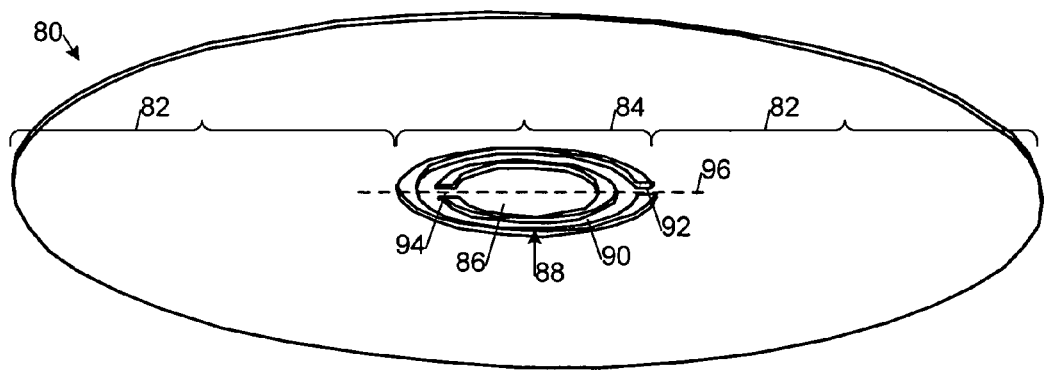
FIGS. 5A and 5B respectively are a top view and a bottom view of an embodiment of a target electrode that includes a peripheral target electrode structure surrounding a central target electrode structure that includes a displaceable electrode.
Figure 5B:
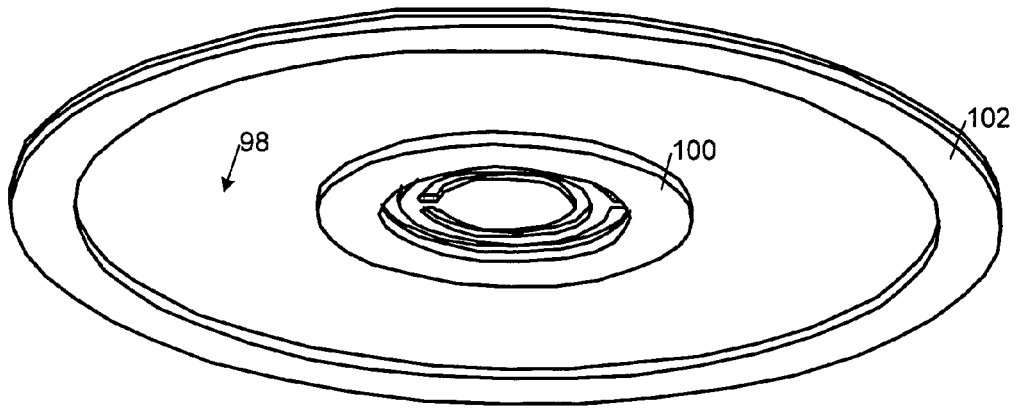

FIG. 5A shows a top view of an exemplary embodiment 80 of the planar target electrode 61 (shown in FIGS. 4A and 4B). The target electrode 80 includes a ring-shaped peripheral target electrode structure 82 surrounding a central target electrode structure 84. The central target electrode structure 84 includes a displaceable electrode 86 that is connected to the peripheral target electrode structure 82 by a planar restoring mechanism 88. The restoring mechanism 88 includes a ring 90 that is connected to the peripheral target electrode structure 82 and the displaceable electrode 86 by respective flexible linkages 92, 94, which are aligned with an axis 96 that bisects the displaceable electrode 86. Referring to FIG. 5B, the target electrode 80 includes an optional uniform thin film 98 of dielectric material that coats the bottom surfaces of the target electrode and two ring-shaped dielectric films 100, 102 that are adhered to respective bottom surface areas of the thin film dielectric coating 98. In some embodiments, the planar target electrode 80 is cut out of a sheet of electrically conducting material (e.g., a metal) using a stamp or a die.

Figure 6A:
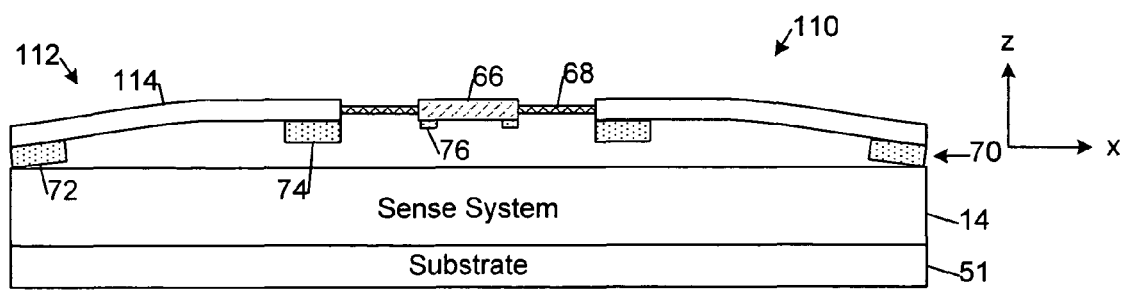
FIG. 6A is a diagrammatic cross-sectional view of an embodiment of the pointing device of FIG. 1 that includes an embodiment of a resilient target electrode that has a displaceable electrode.

FIG. 6A shows an embodiment 110 of the pointing device 10 that includes an embodiment 112 of the target electrode 52 (see FIGS. 3A and 3B). The target electrode 112 is similar to the target electrode embodiment 61 except that, instead of having a planar equilibrium state, the target electrode 112 has a convex equilibrium state. In this embodiment, the peripheral target electrode structure 114 of the target electrode 112 provides the convex shape of the target electrode 112 in the equilibrium state. The peripheral target electrode structure 114 is resilient and conforms to surface areas of the sense electrode structure of the sense system 14 in response to an applied force that urges the target electrode 112 against the sense electrode structure. This flexing of the target electrode 112 can be used to detect applied pressure from the user finger 26.

Figure 6B:
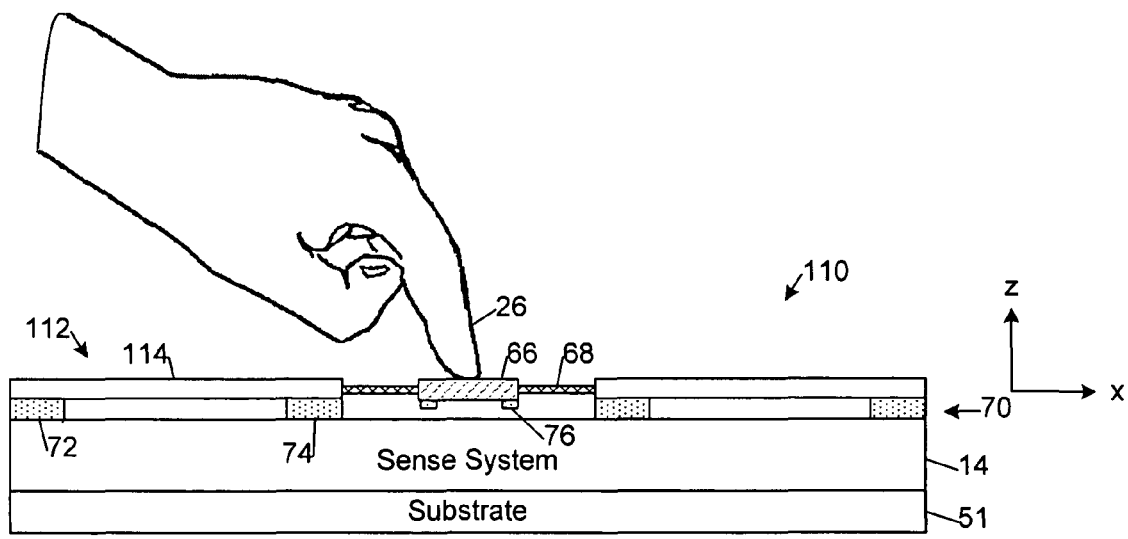
FIG. 6B is a diagrammatic cross-sectional view of the pointing device shown in FIG. 6A in which the target electrode has been deformed to conform to surface areas of the sense system.
Figure 6C:
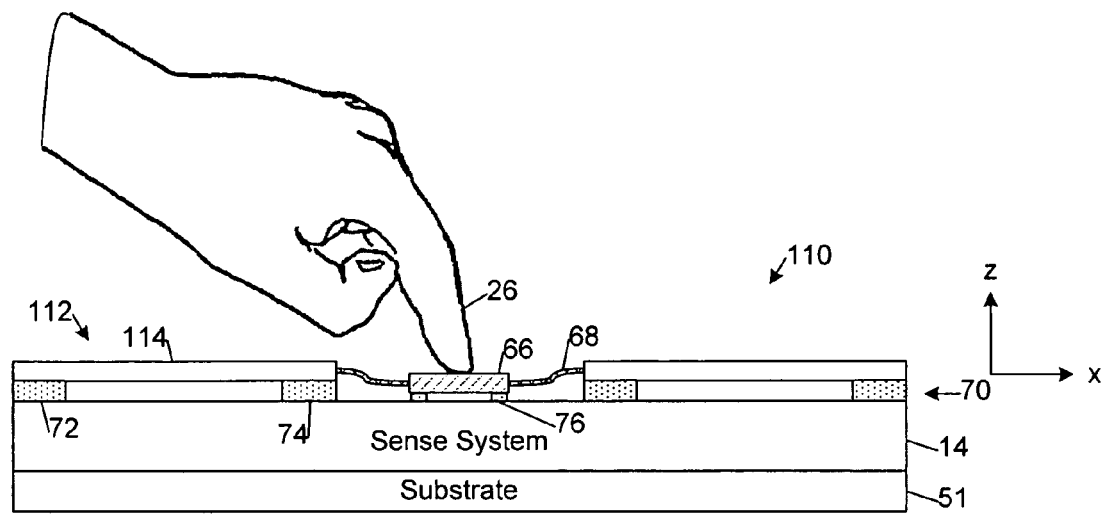
FIG. 6C is a diagrammatic cross-sectional view of the pointing device shown in FIG. 6B in which the displaceable electrode has been moved against the sense system in response to a force applied by a user's finger.

FIGS. 6B and 6C show an exemplary illustration of the peripheral target electrode structure 14 and the displaceable electrode 66 moved from the equilibrium position shown in FIG. 6A and adjacent the sense system 14 in response to a force applied by the user's finger 26. FIGS. 6B and 6C show the user's finger 26 in contact with the displaceable electrode 66 for illustrative purposes only. In actual embodiments, the user's finger 26 is electrically insulated from the displaceable electrode 66 by other components of the pointing device 10. The force that is applied by the user's finger 26 deforms the peripheral target electrode structure 114 and the restoring mechanism 68. In FIG. 6B, the target electrode structure 114 has been deformed to conform to surface areas of the sense system. In FIG. 6C, the displaceable electrode 66 has been moved against the sense system in response to a force applied by a user's finger 26. In response to the applied force, the peripheral target electrode structure 114 applies an opposing force urging the target electrode 112 towards the equilibrium state. This opposing force allows the target electrode 112 to conform to the surface areas of the sense electrode structure and thereby accommodate any nonplanar deviations in the surfaces of the sense electrode structure. Upon the removal of the user's finger 26 from the displaceable electrode 66, the unopposed force of the peripheral target electrode structure returns the target electrode 82 to the equilibrium state shown in FIG. 6A.

Figure 7:
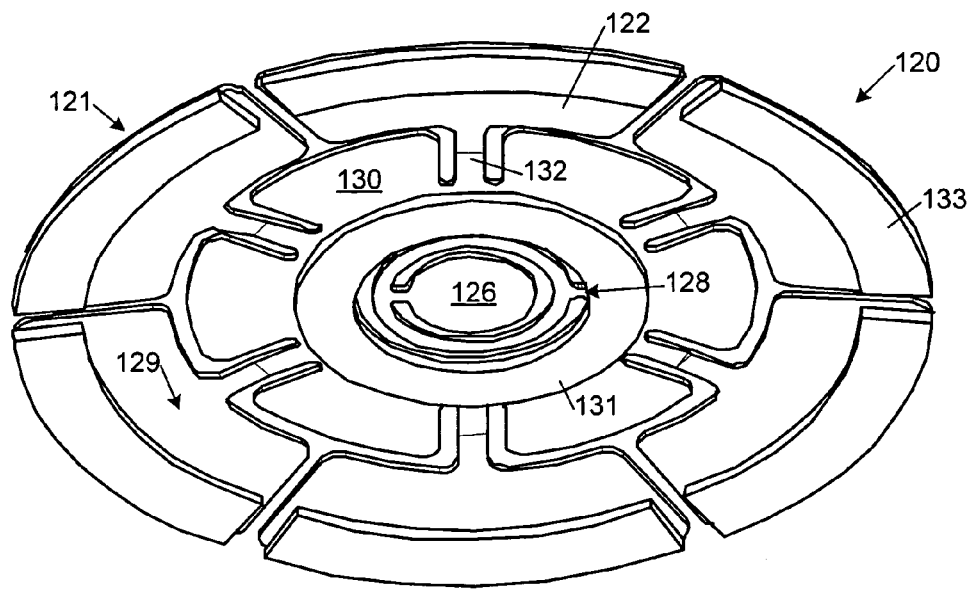
FIG. 7 is a bottom view of an embodiment of a target electrode that includes a peripheral target electrode structure that has discrete conformable segments in a peripheral area surrounding a central target electrode structure that has a displaceable electrode.

FIG. 7 shows a bottom view of an exemplary embodiment 120 of the target electrode 112 (shown in FIGS. 6A and 6B). In this embodiment, the peripheral target electrode structure 121 includes discrete segments 122 surrounding a central target electrode structure 124. The discrete segments 122 are attached to an inner circumferential portion 130 of the peripheral target electrode structure 121 by respective resilient linkages 132. The central target electrode structure 124 includes a displaceable electrode 126 and a restoring mechanism 128. As shown in FIG. 7, the target electrode 120 includes an optional uniform thin film 129 of dielectric material that coats the bottom surfaces of the target electrode and two ring-shaped dielectric films 131, 133 that are adhered to respective bottom surface areas of the thin film dielectric coating 129. In some embodiments, the planar target electrode 120 is cut out of a sheet of electrically conducting material (e.g., a metal) using a stamp or a die.

The resilient linkages 132 allow the discrete segments 122 to conform individually to the surface areas of the sense electrode structure. In particular, in an undeformed state each of the discrete segments 122 is angled towards the sense electrode structure to provide the target electrode 120 with a convex shape. In response to a downward force applied to the displaceable electrode 126, the peripheral target electrode structure 114 and the restoring mechanism 128 deform from the convex equilibrium state to a planar shape that conforms to the surface areas of the sense system 14. In this process, each of the linkages 132 applies an opposing force urging the target electrode 114 towards the equilibrium state. These opposing forces allow the target electrode 114 to conform to the surface areas of the sense electrode structure and thereby accommodate any nonplanar deviations in the surfaces of the sense electrode structure. Upon the removal of the applied force, the unopposed forces of the linkages 132 return the target electrode 114 to the convex equilibrium state shown in FIG. 7.

Figure 8A:
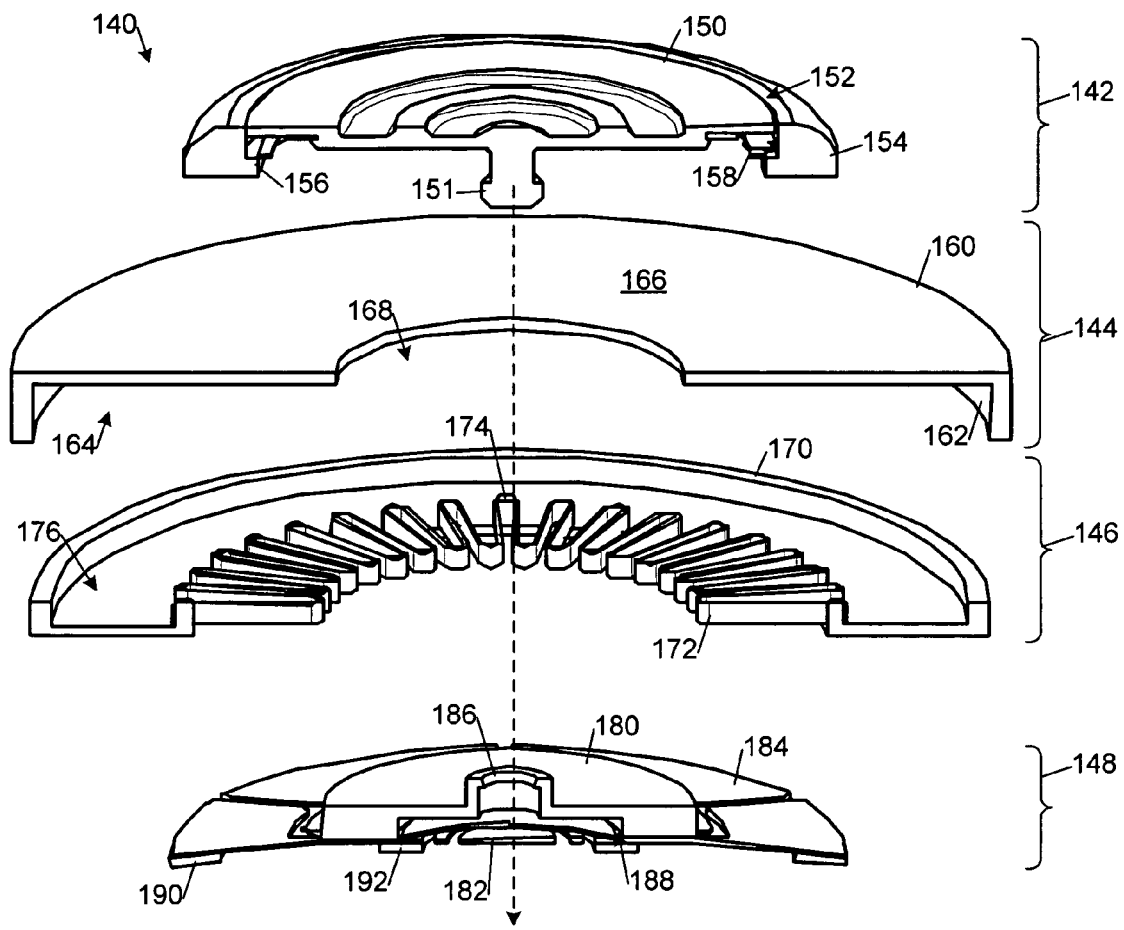
FIGS. 8A and 8B respectively are an exploded view and a cross-sectional view of an embodiment of the displaceable member shown in FIG. 1.

FIGS. 8A shows an exploded view of an embodiment 140 of the displaceable member 10 that includes a button 142, a housing 144, a restoring mechanism 146, and a target electrode assembly 148.

The button 142 includes an actuation member 150 that has a central post 151 and a top circumferential edge 152, which is bonded to a support ring 154. The button 142 typically is unitary molded structure that is formed of a flexible plastic material. The support ring 154 has a flange 156 that supports an annular leaf spring 158, which resiliently supports the actuation member 150. The leaf spring 158 urges the actuation member 150 towards the equilibrium position shown in FIGS. 8A and 8B in response to application of an external force to the actuation member 150 along the vertical (or z-axis) direction. An optional thin film of a low-friction material (e.g., TEFLON®) may coat the bottom annular surface of the support ring 154.

The housing 144 includes a top wall 160 and a cylindrical sidewall 162 that define an inner chamber 164, which contains the restoring mechanism 146 and the target electrode assembly 148. The top wall 160 has a top support surface 166 on which the button 142 slides and includes a circular hole 168 through which the post 151 of the actuation member 150 extends. The housing 144 typically is formed of a rigid material such as metal or plastic.

The restoring mechanism 146 includes a support frame 170 and a ribbon spring 172, which is supported by four posts 174 (three of which are shown in FIG. 8A) that extend upwards from an inner annular surface 176 of the support frame 170. The support frame 170 and the ribbon spring 172 typically are formed of a rigid material such as metal or plastic.

The target electrode assembly 148 includes a retaining structure 180, a dome switch 182, and a target electrode 184. The retaining structure 180 has a connector 186 that holds the end of the post 151 of the actuation member 150 and a cavity 188 that contains the dome switch 182. The retaining structure 180 is bonded (e.g., heat-staked) to the target electrode 184, which covers the cavity 188. The bottom surface of the target electrode 184 is coated with a thin dielectric film and two thin film rings 190, 192 of dielectric material are attached to bottom surface areas of the thin dielectric film.

Figure 8B:
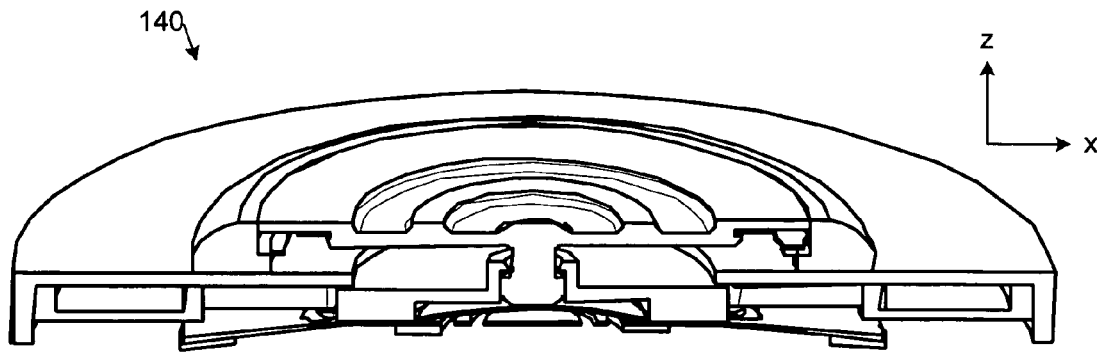

FIG. 8B shows a cross-sectional view of the displaceable member 140 after the button 142, the housing 144, the restoring mechanism 146, and the target electrode assembly 148 have been assembled into a final integrated structure.

In operation, the button 142 is slidable over the top surface 166 of the housing 144 with a range of motion that is defined by the hole 168 in the top wall 160 of the housing 144. Since the target electrode assembly 148 is attached to the button 142 by the post 151, the target electrode assembly 148 moves laterally with the same range of motion. A downward force applied along the vertical (or z-axis) direction to the actuation member 150 is transmitted by the post 151 to the dome switch 182 and the displaceable electrode of the target electrode 184. In response to the application of such a downward force, the dome switch 182 provides tactile feedback to the user and the displaceable electrode moves towards the central sense electrode of the sense system 14 (shown in FIG. 1).

IV. Exemplary Embodiments of the Measurement Circuit and the Processing System

A. Overview

Figure 9A:
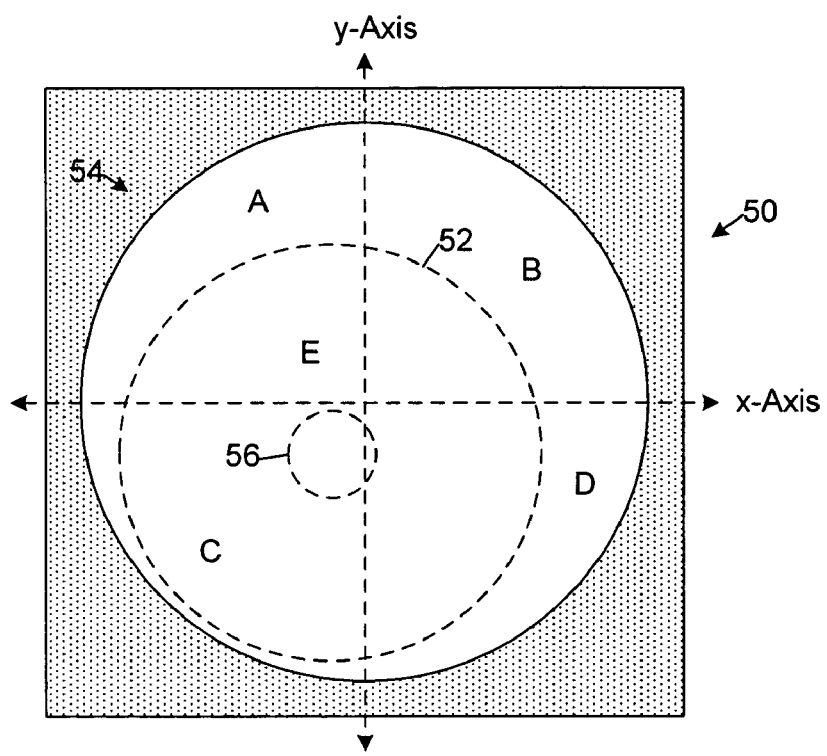
FIG. 9A is a diagrammatic top view of a two-dimensional coordinate system superimposed over the embodiment of the sense electrode structure shown in FIGS. 3A and 3B.
Figure 9B:
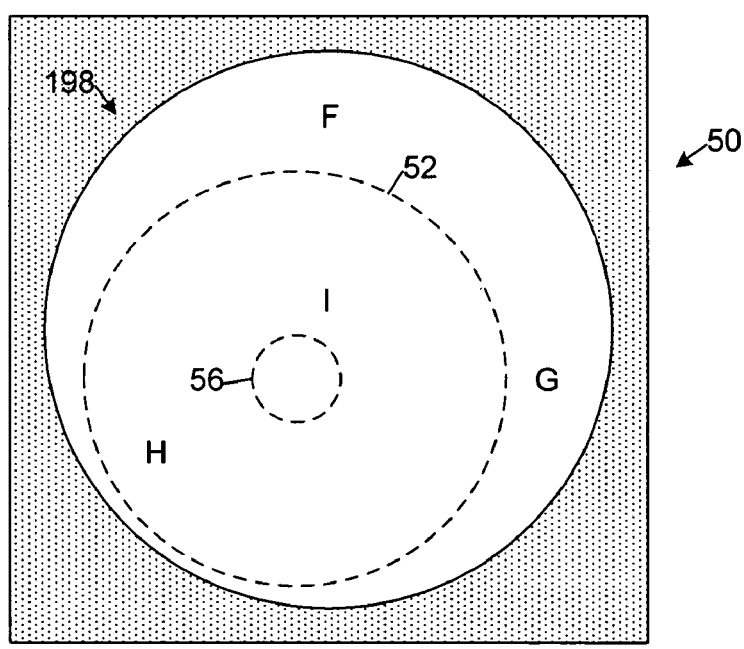
FIG. 9B is a diagrammatic top view of an embodiment of the sense electrode structure that includes three peripheral sense electrodes surrounding a central sense electrode.

The following exemplary pointing device methods are described in the context of the pointing device 50 (shown in FIGS. 3A and 3B). As shown in FIG. 9A, the sense electrode structure 54 in this embodiment includes four peripheral sense electrodes A-D surrounding a single sense electrode E, and the target electrode 52 includes a peripheral target electrode structure surrounding a single central target electrode structure 56. In other embodiments, the sense electrode structure 54 may include a different number of peripheral sense electrodes. For example, FIG. 9B shows a sense electrode structure 198 that includes three peripheral sense electrodes F, G, H surrounding a central sense electrode I.

FIG. 9 shows an exemplary two-dimensional x-y coordinate system that is superimposed over the sense electrode structure 54. This coordinate system is oriented so that the x-axis separates the peripheral sense electrodes A, B from the peripheral sense electrodes C, D and the y-axis separates the peripheral sense electrodes A, C from the peripheral sense electrodes B, D. In this orientation, the peripheral sense electrodes A, C have x-axis coordinates defined solely on one side of the x-axis and the peripheral sense electrodes B, D have x-axis coordinates defined solely on the opposite side of the x-axis. Each of the x-axis and the y-axis bisects the central sense electrode E.

Figure 10:
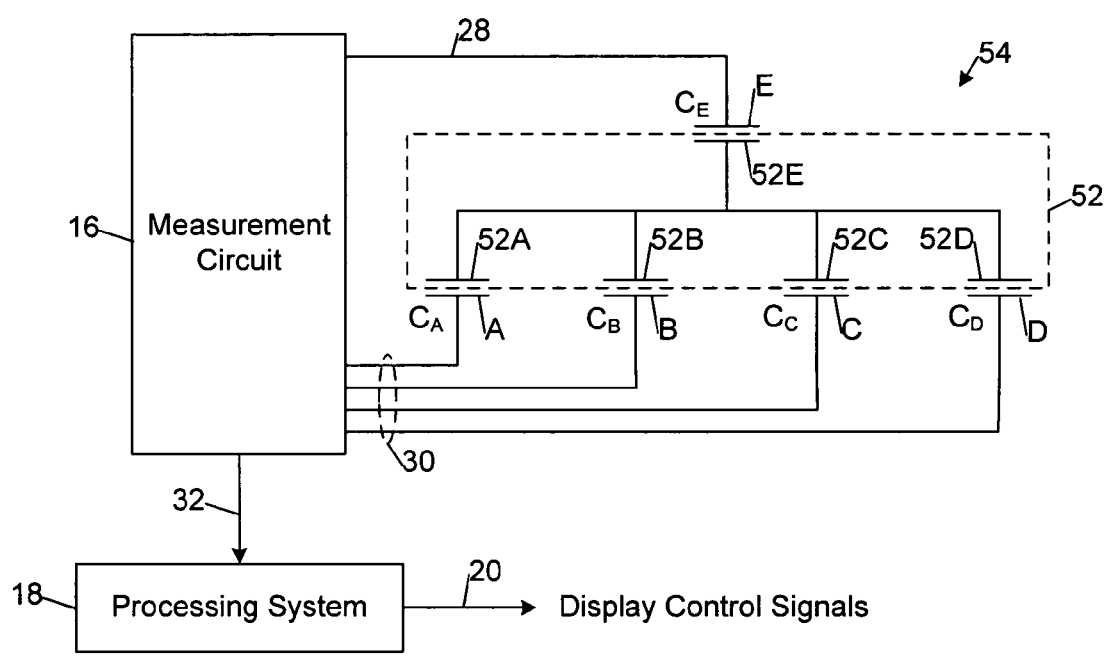
FIG. 10 is a block diagram of a processing system and a measurement circuit that is electrically connected to an equivalent circuit of the target electrode and the sense electrode structure shown in FIGS. 3A and 3B.

FIG. 10 is a block diagram of an equivalent circuit of the target electrode 52 and the sense electrode structure 54. The respective portions of the target electrode 52 that overlap the sense electrodes A-E form respective parallel plate capacitors having capacitances that are proportional to the corresponding overlap amounts. Since all of the capacitors share portions of the target electrode 52, the equivalent circuit includes five capacitors $C_A$, $C_B$, $C_C$, $C_D$, $C_E$ that are connected to the common target electrode 52, which has respective portions identified by reference numbers 52A, 52B, 52C, 52D, 52E. In the illustrated embodiment, the input signals 28 are applied across respective pairings of the central sense electrode E and respective ones of the peripheral sense electrodes A-D. Therefore, the equivalent circuit includes the capacitance $C_E$ of the central sense electrode E coupled in series with the parallel capacitances $C_A$, $C_B$, $C_C$, $C_D$ of the peripheral sense electrodes A-D.

In a given measurement cycle, the measurement circuit 16 generates a respective measurement value 32 for each of the peripheral sense electrodes A-D by applying a respective input signal across the corresponding peripheral sense electrode and, the central sense electrode E. The input signals 28 may be driven through the central sense electrode E and the measurements made at the output terminals of the peripheral sense electrodes A-D. Alternatively, the input signals 28 may be driven through each of the peripheral sense electrodes A-D and the measurements made at the output terminal of the central sense electrode E in a time multiplexed manner. The target electrode capacitively couples the applied input signals from the measurement system 16 across the corresponding pairs of the central sense electrode E and the respective ones of the peripheral sense electrodes A-D. In response to the applied input signals, the sense electrode structure 54 produces sense signals 30 that are responsive to a touching of the displaceable member 12 by the user's finger 26 and to different positions of the displaceable member 12 in the operational zone. In particular, each of the measurement values that is generated by the measurement system 16 is indicative of a respective degree of overlap between the target electrode 52 and the corresponding peripheral sense electrode. In addition, the combination of the measurement values that are generated during a given measurement cycle is indicative of the vertical (or z-axis) force that is applied to the displaceable member.

The processing system 18 produces the display control signals 20 from the measurement values 32. In this process, the processing system 18 determines the position of target electrode 52 in relation to the peripheral sense electrodes A-D based on the measurement values 32.

B. Exemplary Measurement Circuit Embodiments

Figure 11:
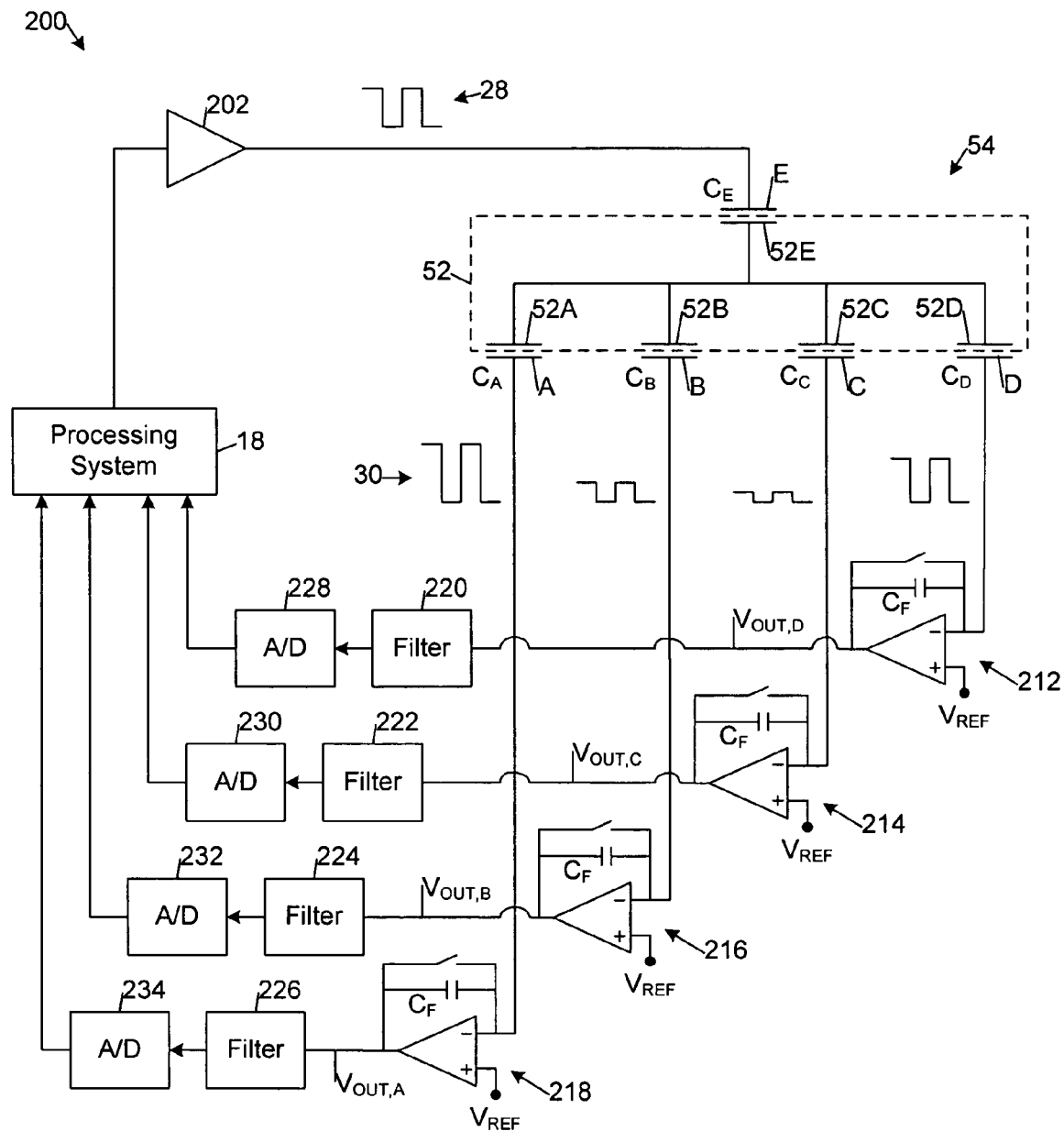
FIG. 11 is a circuit diagram of an embodiment of the measurement circuit shown in FIG. 1.

FIG. 11 shows an embodiment 200 of the measurement circuit 16. The measurement circuit 200 includes a drive amplifier 202 and a respective measurement circuit 204, 206, 208, 210 connected to the output terminal of each of the peripheral sense electrodes A-D. The drive amplifier 202 drives the input signals 28 through the central sense electrode E. In the illustrated embodiment, the input signals 23 are square wave pulses. Each of the measurement circuits 204-210 includes a respective integrator 212, 214, 216, 218, a respective filter 220, 222, 224, 226, and a respective analog-to-digital (A/D) converter 228, 230, 232, 234. Each of the integrators 212-218 includes a respective positive input terminal that is connected to a reference voltage ($V_{REF}$) and a respective negative terminal that is connected to the corresponding output terminal through a respective negative feedback loop that includes a feedback capacitor $C_F$ and a reset switch. Each of the filters 220-226 filters the output of a respective one of the integrators 212-218. Each of the analog-to-digital converters 228-234 samples the filtered signals output from a respective one of the filters 220-226. The processing system 18 receives the digital measurement values generated by the analog-to-digital converters 228-234.

Figure 12:
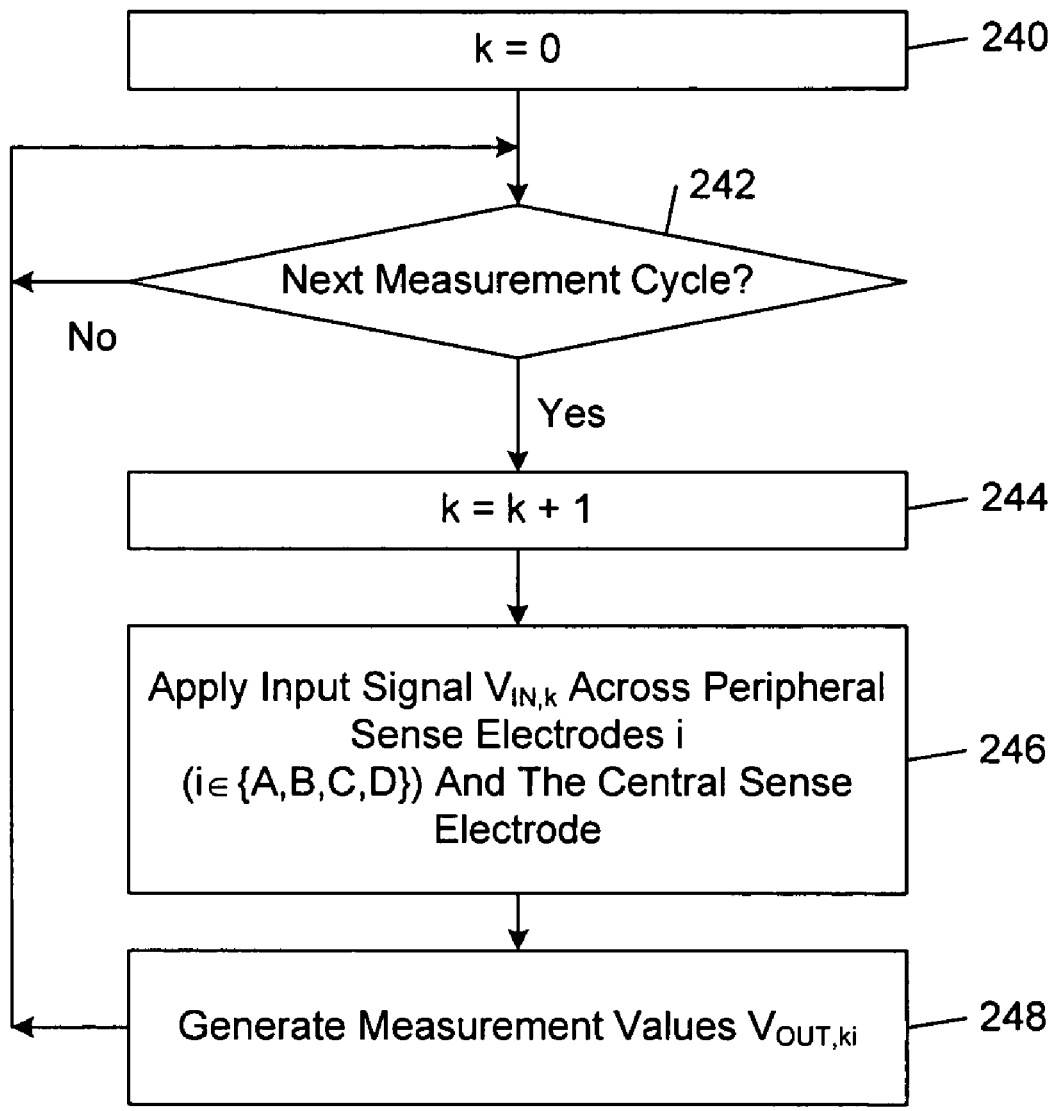
FIG. 12 is a flow diagram of an embodiment of a method of obtaining measurement values by applying input signals across the target electrode and the sense electrode structure shown in FIGS. 3A and 3B.

FIG. 12 shows an embodiment of a method in accordance with which the measurement system 16 generates the measurement values 32. In accordance with this embodiment, the measurement cycle index k optionally is initialized to 0 (FIG. 12, block 240). At the beginning of each measurement cycle (FIG. 12, block 242), the measurement cycle index is incremented by 1 (FIG. 12, block 244). The measurement circuit 16 applies the input signal $V_{IN,k}$ across the peripheral sense electrodes i (where i ∈ {A, B, C, D}) and the central sense electrode E (FIG. 12, block 246). The measurement circuit 16 then generates the measurement values $V_{OUT,ki}$ (FIG. 12, block 248). The measurement circuit 16 then waits for the next measurement cycle before repeating the process (FIG. 12, block 242).

Thus, during each measurement cycle k, the processor 18 closes the reset switches of the integrators 212-218 and applies a square wave pulse with a magnitude $V_{IN,k}$ to the central sense electrode E. The output terminals of each of the integrators 212-218 will generate a voltage $V_{OUT,k}$ that is given by equation (1):

$$V_{OUT,k} = \frac{C_{EQ,i}}{C_F} \cdot (V_{IN,k} - V_{REF}) + V_{REF} \qquad (1)$$

where $C_F$ is the value of the feedback capacitors in the negative feedback loops of the integrators 212-218, $C_{EQ,i}$ is the equivalent series sum of the capacitance $C_E$ of the central sense electrode E and the capacitance $C_i$ of a respective one of the peripheral sense electrodes A-D, and is given by equation (2).

$$C_{EQ,i} = \frac{C_i \cdot C_E}{C_i + C_E} \qquad (2)$$

Equation (1) is rewritten in terms of $C_{EQ,i}$ in equation (3):

$$C_{EQ,i} = C_F \cdot \frac{(V_{OUT} - V_{REF})}{(V_{IN} - V_{REF})} = K_1 \cdot V_{OUT,i} + K_2 \qquad (3)$$

where $K_1 = C_F/(V_{IN,i} - V_{REF})$ and $K_2 = C_F \cdot V_{REF}/(V_{IN,i} - V_{REF})$. Thus, since $V_{IN}$, $V_{REF}$, and $C_F$ are known, the measured output voltage $V_{OUT}$ gives the value of $C_{EQ,i}$.

In the embodiment illustrated in FIG. 11, the measurement circuit 200 drives the input signals 28 through the central sense electrode E and measures the resulting sense signals 30 from the output terminals of the peripheral sense electrodes A-D. Other embodiments of the measurement circuit 16 (shown in FIG. 1) may drive the input signals 28 through each of the peripheral sense electrodes A-D and measure the resulting sense signals 30 from the output terminal of the central sense electrode E in a time-multiplexed manner.

C. Exemplary Processing System Embodiments

Figure 13:
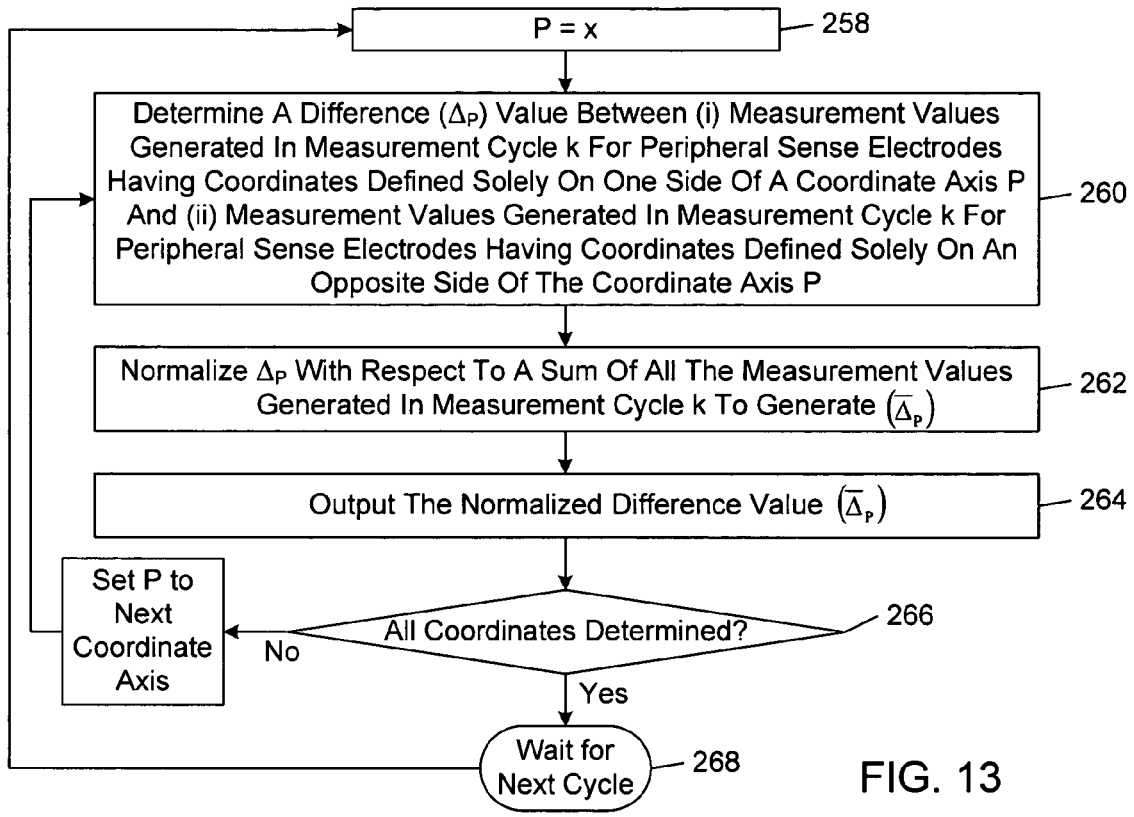
FIG. 13 is a flow diagram of an embodiment of a method of producing display control signals from the measurement values generated in accordance with the method of FIG. 12.

FIG. 13 shows an embodiment of a method in accordance with which the processing system 18 produces the display control signals 20 from the measurement signals 32. In accordance with this embodiment, the processing system 18 determines a difference value ($\Delta_P$) between (i) measurement values generated a given measurement cycle k for peripheral sense electrodes on one side of a coordinate axis P (e.g., P ∈ {x,y}) and (ii) measurement values generated in the given measurement cycle k for peripheral sense electrodes on an opposite side of the coordinate axis P (FIG. 13, block 260). The processing system 18 normalizes the difference value ($\Delta_P$) with respect to a sum of all the measurement values generated in the given measurement cycle k to generate ($\overline{\Delta}_P$) (FIG. 13, block 262). The processing system 18 outputs the normalized difference value ($\overline{\Delta}_P$) (FIG. 13, block 264). If coordinates for all of the coordinate axes have not been determined (FIG. 13, block 266), the process is repeated for the next coordinate axis (FIG. 13, blocks 260-264). Otherwise, the processing system 18 waits for the next measurement cycle (FIG. 13, block 268) before repeating the process (FIG. 13, blocks 258-266).

Thus, with respect to the x-axis and the y-axis that are defined in FIG. 9, the processing system determines the difference values $\Delta_x$ and $\Delta_y$ in accordance with equations (4) and (5):

$$\Delta_x = (C_{EQ,B} + C_{EQ,D}) - (C_{EQ,A} + C_{EQ,C}) \quad (4)$$
$$= K_1 \cdot (V_{OUT,B} + V_{OUT,D} - V_{OUT,A} - V_{OUT,C})$$

$$\Delta_y = (C_{EQ,A} + C_{EQ,B}) - (C_{EQ,C} + C_{EQ,D}) \quad (5)$$
$$= K_1 \cdot (V_{OUT,A} + V_{OUT,B} - V_{OUT,C} - V_{OUT,D})$$

The normalized difference values $\overline{\Delta}_x$ and $\overline{\Delta}_y$ are calculated in accordance with equations (6) and (7) under the assumption that $V_{REF}$ is set to zero potential:

$$\overline{\Delta}_x = \frac{(C_{EQ,B} + C_{EQ,D}) - (C_{EQ,A} + C_{EQ,C})}{C_{EQ,A} + C_{EQ,B} + C_{EQ,C} + C_{EQ,D}} \quad (6)$$
$$= \frac{(V_{OUT,B} + V_{OUT,D}) - (V_{OUT,A} - V_{OUT,C})}{V_{OUT,A} + V_{OUT,B} + V_{OUT,C} + V_{OUT,D}}$$

$$\overline{\Delta}_y = \frac{(C_{EQ,A} + C_{EQ,B}) - (C_{EQ,C} + C_{EQ,D})}{C_{EQ,A} + C_{EQ,B} + C_{EQ,C} + C_{EQ,D}} \quad (7)$$
$$= \frac{(V_{OUT,A} + V_{OUT,B}) - (V_{OUT,C} + V_{OUT,D})}{V_{OUT,A} + V_{OUT,B} + V_{OUT,C} + V_{OUT,D}}$$

These normalized difference values $\overline{\Delta}_x$ and $\overline{\Delta}_y$ may be scaled to produce values corresponding to the x and y coordinates of the displaceable member in the operational zone. Normalizing the difference values $\Delta_x$ and $\Delta_y$ in accordance with equations (6) and (7) reduces the impact of unintended applied forces that tend to tilt the target and other variations in the gap separating the target electrode and the sense electrodes.

In the embodiments described in connection with FIGS. 3A-8B, the target electrode includes a peripheral target electrode structure surrounding a central target electrode structure comprising a displaceable electrode 56 that is movable towards and away from the sense electrode structure substantially independently of the surrounding target electrode structure. In some of these embodiments, the central sense electrode E completely overlaps the displaceable electrode 56 in each position of the displaceable member in the operational zone. In these embodiments, the vertical motion of the displaceable electrode 56 affects only the capacitance $C_E$ of the central sense electrode E. Therefore, the capacitance $C_E$ affects the measurements that are made for all of the peripheral sense electrodes. As a result, the capacitance $C_E$ only minimally affects the determination of the x and y coordinates of the displaceable member because these coordinates are normalized with respect to the total capacitance.

In some embodiments, vertical (or z-axis) forces that are applied to the displaceable member may be measured by determining the total capacitance ($C_T$) from the measurement values 32. Assuming that $V_{REF}$ is set to zero potential, $C_T$ is given by equation (8):

$$C_T = C_{EQ,A} + C_{EQ,B} + C_{EQ,C} + C_{EQ,D} \quad (8)$$
$$= K_1 \cdot (V_{OUT,A} + V_{OUT,B} + V_{OUT,C} + V_{OUT,D})$$

The processing system 18 detects movement of the displaceable electrode 56 towards the central sense electrode 56 based on a sum of all the measurement values generated in the given measurement cycle. In particular, the vertical displacement of the displaceable electrode will reduce the gap under the displaceable electrode and thereby increase the total capacitance measured by the processing system 18.

Figure 14:
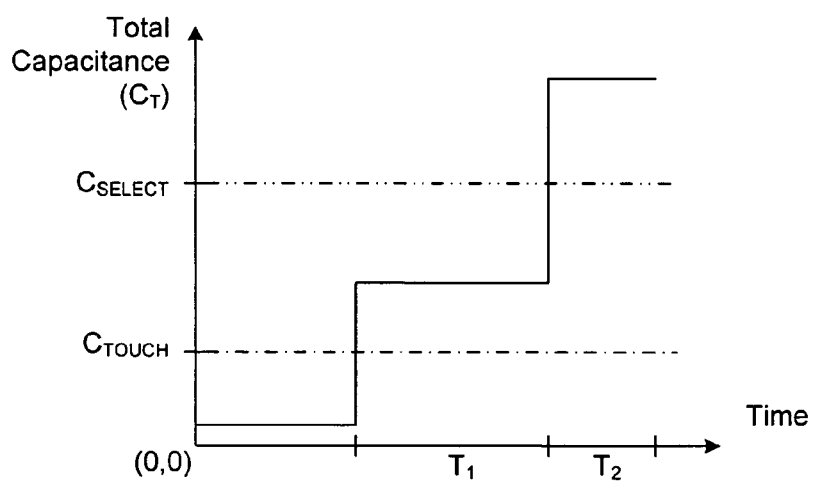
FIG. 14 is a graph of the total capacitance measured during a measurement cycle in accordance with the method of FIG. 12 plotted as a function of time.

FIG. 14 shows a devised graph of the total capacitance $C_T$ plotted as a function of time during a period when the user is applying to the displaceable electrode 56 a touching force during period $T_1$ and a selection force during period $T_2$. In some embodiments, the processing system 18 generates a touch state signal indicating that the displaceable member has been contacted by an external force in response to a determination that the sum of all the measurement values that are generated in a given measurement cycle exceeds a first threshold $C_{TOUCH}$. The processing system 18 also generates a select state signal indicating that the displaceable member has been depressed to make a selection in response to a determination that the sum of all the measurement values generated in the given measurement cycle exceeds a second threshold $C_{SELECT}$ greater than the first threshold $C_{TOUCH}$.

V. Conclusion

The embodiments that are described in detail herein provide displacement type pointing devices and methods that include capacitive sensing of the position of the displaceable member in ways that compensate for unintended tilt forces and other unintended gap variations across the capacitive sensing structure. Some of these embodiments also are capable of detecting with high accuracy user inputs that are applied to the displaceable member in vertical as well as lateral directions. In particular, some of these embodiments are capable of measuring force-induced displacements of the displaceable member in three dimensions without substantial crosstalk between the lateral measurements and the vertical measurements. These measurements may be made without any wired electrical connections to the displaceable member. In addition, these measurements may be made over the full range of lateral travel in the operational zone.

Other embodiments are within the scope of the claims.

What is claimed is:

1. A pointing device, comprising:
   a sense electrode structure comprising an arrangement of peripheral sense electrodes in a peripheral region surrounding a central sense electrode;
   a displaceable member movable in an operational zone over the sense electrode structure and comprising a target electrode facing the sense electrodes and overlapping at least a respective portion of the central sense electrode in each position of the displaceable member in the operational zone; and
   a measurement circuit coupled to the sense electrodes and operable to generate measurement values indicative of degrees of overlap between the target electrode and respective ones of the sense electrodes;
   wherein in a given measurement cycle the measurement circuit is operable to generate a respective measurement value for each of the peripheral sense electrodes by applying a respective input signal across the corresponding peripheral sense electrode and the central sense electrode, each of the measurement values being indicative of a respective degree of overlap between the target electrode and the corresponding peripheral sense electrode.

2. The pointing device of claim 1, wherein the target electrode completely overlaps the central sense electrode in each position of the displaceable member in the operational zone.

3. The pointing device of claim 1, wherein the sense electrodes extend across a sense region that completely overlaps the target electrode in each position of the displaceable member in the operational zone.

4. The pointing device of claim 1, wherein the target electrode comprises a peripheral target electrode structure surrounding a central target electrode structure comprising a displaceable electrode that is movable towards and away from the sense electrode structure substantially independently of the surrounding peripheral target electrode structure.

5. The pointing device of claim 4, wherein the central sense electrode completely overlaps the displaceable electrode in each position of the displaceable member in the operational zone.

6. The pointing device of claim 4, wherein the central target electrode structure comprises a resilient restoring mechanism connecting the displaceable electrode to the peripheral target electrode structure, the restoring mechanism being operable to urge the displaceable electrode towards an equilibrium position in response to application of an external force to the displaceable electrode.

7. The pointing device of claim 1, further comprising a dielectric spacer between the target electrode and the sense electrode structure.

8. The pointing device of claim 7, wherein the dielectric spacer comprises discrete dielectric films attached to respective spaced apart surface areas of the target electrode facing the sense electrode structure, the dielectric films being free to slide over surfaces of the sense electrode structure.

9. The pointing device of claim 8, wherein respective ones of the discrete dielectric films are attached to peripheral surface areas of the target electrode and at least one central surface area of the target electrode.

10. The pointing device of claim 1, wherein the target electrode is resilient and conforms to surface areas of the sense electrode structure in response to a force applied to the displaceable member and urging the target electrode adjacent the sense electrode structure.

11. The pointing device of claim 10, wherein the target electrode comprises a central target electrode structure surrounded by a peripheral target electrode structure comprising discrete segments that are individually conformable to the surface areas of the sense electrode structure.

12. The pointing device of claim 11, wherein in an undeformed state each of the segments of the peripheral target electrode structure is angled towards the sense electrode structure.

13. The pointing device of claim 1, further comprising a processing system operable to produce display control signals from the measurement values.

14. The pointing device of claim 13, wherein the processing system is operable to determine a difference value between (i) measurement values generated in the given measurement cycle for peripheral sense electrodes having positions defined solely on one side of a coordinate axis defined in relation to the operational zone and (ii) measurement values generated in the given measurement cycle for peripheral sense electrodes having positions defined solely on an opposite side of the coordinate axis, and determine a respective displacement value by normalizing the difference value with respect to a sum of all the measurement values generated in the given measurement cycle.

15. The pointing device of claim 13, wherein:
the target electrode comprises a peripheral target electrode structure surrounding a central target electrode structure comprising a displaceable electrode that is movable towards and away from the sense electrode structure substantially independently of the surrounding target electrode structure; and the processing system is operable to detect movement of the displaceable electrode towards the central sense electrode based on a sum of all the measurement values generated in the given measurement cycle.

16. The pointing device of claim 15, wherein the processing system is operable to generate a touch state signal indicating that the displaceable member has been contacted by an external force in response to a determination that the sum of all the measurement values generated in the given measurement cycle exceeds a first threshold.

17. The pointing device of claim 16, wherein the processing system is operable to generate a select state signal indicating that the displaceable member has been depressed to make a selection in response to a determination that the sum of all the measurement values generated in the given measurement cycle exceeds a second threshold greater than the first threshold.

18. The pointing device of claim 13, wherein:
the target electrode is generally convex in an undeformed equilibrium state and is generally planar in a biased state in which the target electrode is urged adjacent the sense electrode structure by an applied force; and the processing system is operable to generate a touch state signal indicating that the displaceable member has been contacted by an external force from the measurement values generated by the measurement circuit during movement of the target electrode from the equilibrium state to the biased state.

19. The pointing device of claim 18, wherein the target electrode comprises a peripheral target electrode structure surrounding a central target electrode structure comprising a displaceable electrode that is movable towards and away from the sense electrode structure substantially independently of the surrounding peripheral target electrode structure, and the processing system is operable to generate a select state signal indicating that the displaceable member has been depressed to make a selection from the measurement values generated by the measurement circuit during movement of the central target electrode structure toward the sense electrode structure after the peripheral target electrode structure has been urged adjacent the sense electrode structure.

20. A pointing device, comprising:
a sense electrode structure comprising an arrangement of peripheral sense electrodes in a peripheral region surrounding a central sense electrode; and a displaceable member movable in an operational zone over the sense electrode structure and comprising a target electrode facing the sense electrodes and overlapping at least a respective portion of the central sense electrode in each position of the displaceable member in the operational zone;

wherein the target electrode comprises a peripheral target electrode structure surrounding a central target electrode structure comprising a displaceable electrode that is movable towards and away from the sense electrode structure substantially independently of the surrounding peripheral target electrode structure; and wherein the central sense electrode completely overlaps the displaceable electrode in each position of the displaceable member in the operational zone.

21. A pointing device, comprising:
- a sense electrode structure comprising an arrangement of peripheral sense electrodes in a peripheral region surrounding a central sense electrode;
- a displaceable member movable in an operational zone over the sense electrode structure and comprising a target electrode facing the sense electrodes and overlapping at least a respective portion of the central sense electrode in each position of the displaceable member in the operational zone; and
- a dielectric spacer between the target electrode and the sense electrode structure.

* * * * *